United States Patent [19]

De Cardenas

[11] 4,133,655
[45] Jan. 9, 1979

[54] SCRUBBER FOR BLAST FURNACE GAS

[75] Inventor: Roberto R. De Cardenas, Milan, Italy

[73] Assignee: De Cardenas S.p.A., Milan, Italy

[21] Appl. No.: 768,880

[22] Filed: Feb. 15, 1977

[30] Foreign Application Priority Data

Feb. 25, 1976 [IT] Italy .................. 20568 A/76

[51] Int. Cl.² .............................................. B01D 47/10
[52] U.S. Cl. ........................................ 55/223; 55/226;
55/355; 261/DIG. 54; 261/DIG. 56; 266/147;
266/157
[58] Field of Search .............. 55/223, 226, 355;
261/62, DIG. 54, DIG. 56; 266/147, 157

[56] References Cited

U.S. PATENT DOCUMENTS

| 3,116,348 | 12/1963 | Walker | 261/62 |
| 3,199,267 | 8/1965 | Hausberg | 261/DIG. 54 |
| 3,517,485 | 6/1970 | Dellagnese et al. | 55/226 |
| 3,601,374 | 8/1971 | Wheeler | 261/62 |
| 3,648,440 | 3/1972 | Egan | 55/226 |
| 3,844,744 | 10/1974 | Hausberg et al. | 55/226 |
| 3,854,908 | 12/1974 | Hausberg et al. | 55/226 |
| 4,007,025 | 2/1977 | Hegemann | 55/226 |

FOREIGN PATENT DOCUMENTS 428766 10/1974 U.S.S.R. .................. 55/226

Primary Examiner—Frank W. Lutter
Assistant Examiner—David L. Lacey
Attorney, Agent, or Firm—Lane, Aitken & Ziems

[57] ABSTRACT

A scrubber for blast furnace gas has a primary purifying unit and a secondary purifying and pressure adjusting unit in series with the primary unit. The primary purifying unit includes venturi having a divergent-constant diameter-convergent core in which the gas experiences a pressure loss and is subjected to a first washing with water. The secondary purifying unit comprises a multi-stage venturi including a first stage having a constant-diameter annular passage, followed by a diffuser section and at least one adjustable stage in series with the first stage which defines an annular passage of variable size.

12 Claims, 6 Drawing Figures

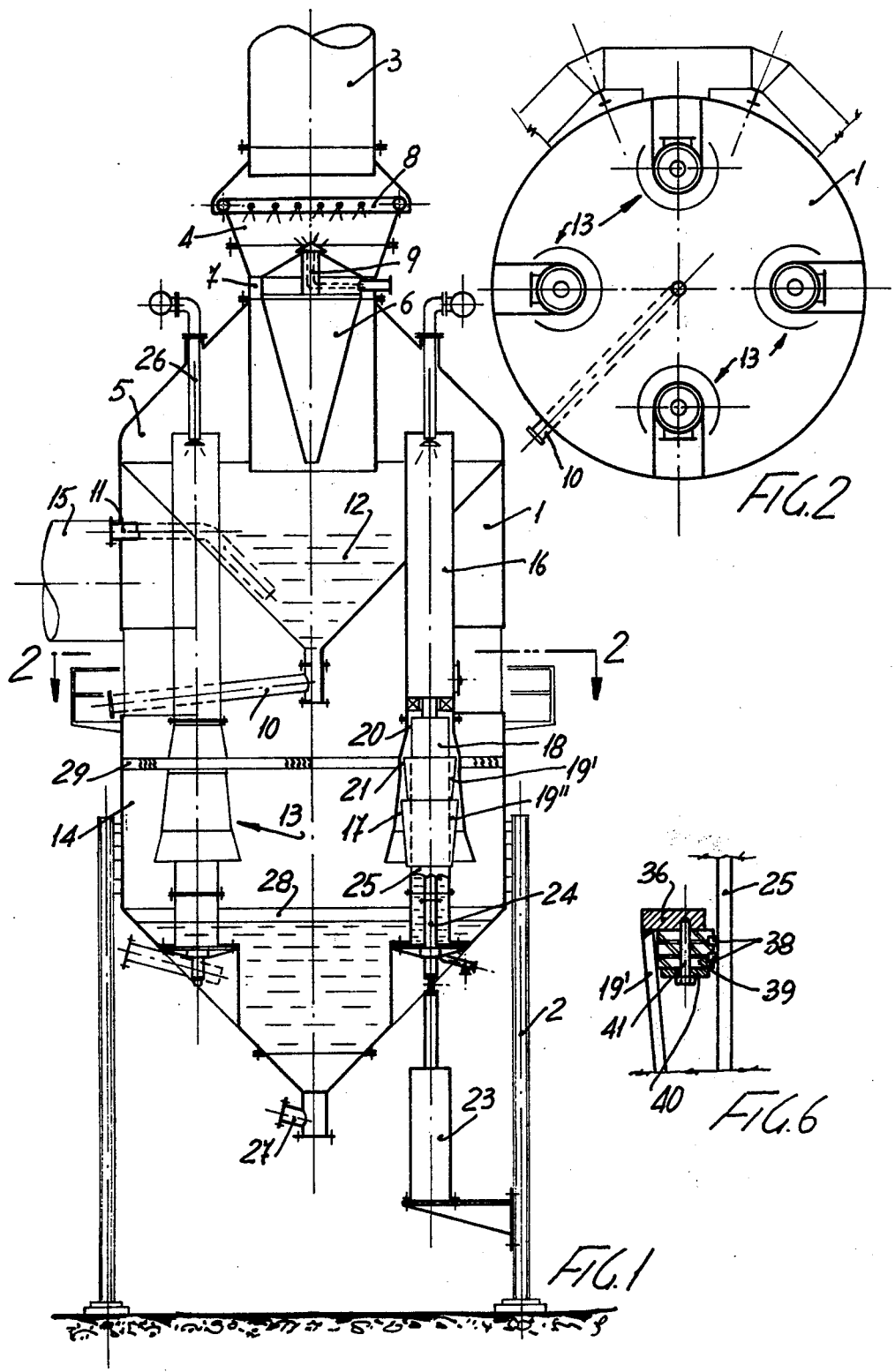

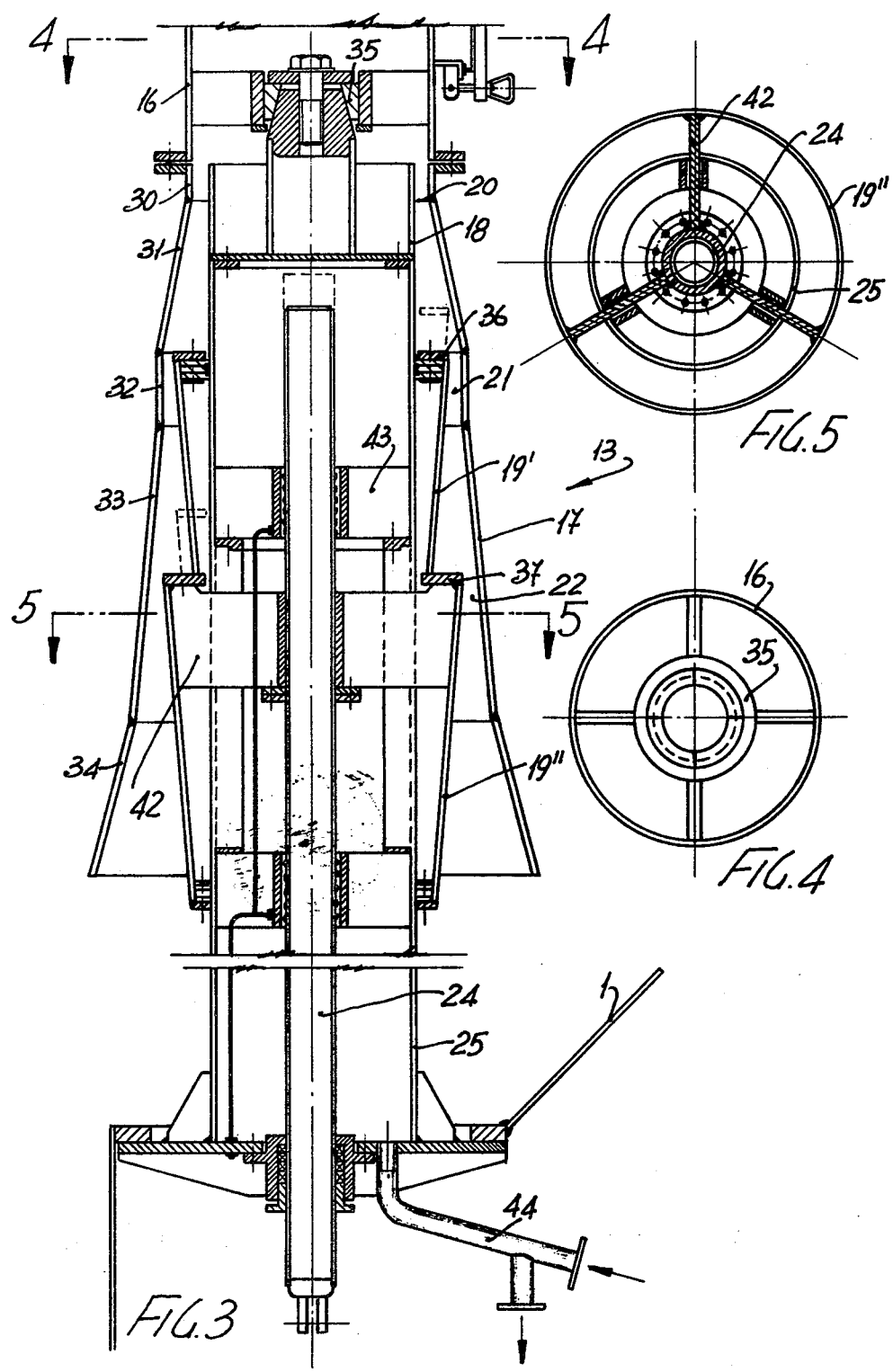

SCRUBBER FOR BLAST FURNACE GAS

BACKGROUND OF THE INVENTION

This invention generally relates to a scrubber for blast furnace gas, by means of which a purification and loss of gas pressure can be accomplished prior to introducing such a gas into an industrial utilization system and which also permits pressure adjustments at the throat of the blast furnace during operation of the latter.

As the pressure at the blast furnace throat increases, there is an increasing need for equipment capable of adjusting the furnace pressure with smaller and smaller percentage differentials and dissipating the gas energy, prior to reusing the gas, with minimal noise generation and minimal wear of the adjustment members.

Purification systems are known which comprise a plurality of parallel throttle valves which adjust and reduce the pressure of the gas previously separated from the scrubbing or washing water, and purification systems are also known which comprise adjustment members within the system for adjusting the gas pressure at a single stage in the presence of water.

The adjustment characteristics of the former system, using throttle valves, proved to be unsatisfactory, particularly at high pressures, because the adjustment characteristics of the system operating at high pressures were extremely sensitive to the displacements of the adjustment members.

Other known purification systems have pressure stage or pressure drop characteristics of their own which are functions of the stroke of the adjustment members, and these systems have proven superior to the aforesaid devices. By controlling the full pressure imparted to the gases, these systems provide acceptable adjustment by controlling the cross-sectional areas of least change. However, these acceptable adjustments become substantially impossible as a result of high pressures that may occur at the blast furnace throat, and particularly in case of wear of this structure.

Additionally, as to wear strength and noise generation, known systems behave quite unsatisfactorily particularly at high pressures, when the gas speed astride the throttling members can attain hypercritical rates or rates close to critical, with the expectable consequences of vibration, noise, and effects upon adjustment accuracy.

The present invention is directed to provide a scrubber for blast furnace gas suitable to improve the adjustment characteristics of the pressure stage and capable of assuring less wear of the adjustment members and a reduced noise generation, since the actual gas speed astride the throttling members is definitely lowered at the critical conditions.

Generally, according to the invention, a scrubber for blast furnace gas comprises a first gas purification unit for providing a first purification in the presence of water, and a second gas purification unit, in series with the former, for providing a second purification in the presence of water and a pressure adjustment, which second purification unit comprises at least one multi-stage venturi including a first stage having a constant annular passage followed by a diffuser and at least a second adjustable stage subsequent to the first stage and defining an annular passage movable and gradually adjustable along a diffuser.

Particularly, the narrow gas passage section or annular groove in the second stage has a larger area than that of the groove in the preceding stage of the multi-stage venturi, and the purification stages are dimensioned, so that the first stage having a constant groove is capable of providing at the minimal furnace pressure, a sufficient pressure drop to obtain the required degree of purification, and so contrived that, as the movable adjustment member starts to move forward, the stage immediately following will create an annular groove or passage which becomes narrower at a determined rate. At a predetermined point further forward movement of the adjustment member does not involve any further narrowing of the groove, but provides a subsequent purification stage behaving as the first purification stage.

Therefore, according to the invention, at the minimal pressure of the furnace the movable adjusting elements do not interfere with the gas flow and the required pressure drop is provided by the first constant groove or passage of the multi-stage venturi. As the pressure, and accordingly the gas density increases, the constant groove provides a loss of load increasing with said pressure. The difference between the desired loss and the loss provided by the first stage of venturi, is obtained by gradually registering or adjusting the minimum passage section of the next adjustable stage or stages, each of which in its adjustment range should create a reduced loss of load than the total increment of loss of load, as a portion of the loss increment has been provided by the preceding stage or stages. This would result in an improvement in the sensitivity and adjustment characteristics of the apparatus.

According to a particular embodiment, the multi-stage venturi comprises a fixed or stationary portion and a movable portion slidably disposed therein. The stationary portion includes a divergent housing formed of a series of cylindrical elements interconnected by frusto-conical elements of varying cross-sectional area, the cross-sectional area increasing in the same direction as the gas flow through the venturi. The movable portion has a number of annular lugs or projections of increasing diameter disposed at axially-spaced positions, which cooperate with the corresponding sections of the stationary portion to define annular grooves or narrow sections for the passage of the gas.

BRIEF DESCRIPTION OF THE DRAWINGS

Hereinafter, the invention will be described in further detail with reference to the figures of the accompanying drawings, showing by mere way of unrestrictive example a scrubber for blast furnace gas incorporating a purification unit according to the invention, and particularly:

FIG. 1 is a general longitudinal sectional view showing a scrubber for blast furnace gas according to the invention;

FIG. 2 is a cross-sectional view taken along line 2—2 of FIG. 1;

FIG. 3 is an enlarged longitudinal sectional view showing the multi-stage venturi according to the invention, forming part of the second purification unit;

FIG. 4 is a cross-sectional view taken along line 4—4 of FIG. 3;

FIG. 5 is a cross-sectional view taken along line 5—5 of FIG. 3; and

FIG. 6 is an enlarged detail view showing the arrangement of the resilient sealing and centering rings for the movable adjusting portion of the multi-stage venturi.

DESCRIPTION OF THE PREFERRED EMBODIMENT

Referring to FIG. 1, there is shown a blast furnace gas scrubber 1 supported by a supporting structure 2. The gas from the blast furnace (not shown) is supplied to scrubber 1 through a conduit 3 leading to a primary venturi 4 opening into a first separating chamber 5 at the top end of the scrubber.

This primary venturi 4 has an internal core 6 having a divergent portion 6a, as seen in the direction of the gas flow, a constant-diameter section 6b defining along with the external housing of the venturi an annular groove 7 or narrow annular passage for the gas of a constant section, within which a first loss of load or pressure drop occurs and a convergent section 6c.

In said venturi 4, a first gas purification or washing occurs with the removal of the solid particles therein by the washing water supplied through an annular nozzle 8 at the inlet end of the venturi and a second central nozzle 9 at the upper end of the divergent portion 6a of said internal core 6.

Flowing along the internal walls of the venturi, the water reaches the annular groove 7, where it is finely divided into droplets entraining the solid gas particles the droplets collect on the bottom of chamber 5, from where they are then discharged through a pipe 10. An overflow pipe 11 prevents the level 12 of water collecting on the bottom of the first separating chamber 5 from reaching or exceeding a corresponding determined level at the lower end of the gas outlet from said venturi 4.

The gas, as partially purified and having its pressure partially reduced by said primary venturi 4 is then caused to flow through secondary adjustment and purification units 13, four of which are shown in FIG. 2, which are disposed parallel to one another but is in series as a whole with the preceding primary purification venturi 4. Since such secondary purification units are of identical construction, only one of these units will be described and shown here below.

Each of said secondary adjustment and purification units substantially comprise a multi-stage venturi positioned within a second separating chamber 14 internally of the scrubber and underlying the preceding venturi, and having the purified gas exiting therefrom through an outlet conduit 15.

Each of the multi-stage venturis, an exemplary constructive embodiment of which is shown in FIGS. 3 through 6, is positioned at the lower end of a vertical conduit 16, the latter having its upper end projecting into said first separating chamber 5 above the water level 12. As shown in FIG. 1, the several conduits 16 conveying the gas from the first separating chamber 5 through the multi-stage venturi 13 to the second separating chamber 14, are peripherally arranged about said primary venturi 4 in order to prevent the washing water, falling from the latter or drawn away by the gas, from passing through the secondary purification units without collecting on the bottom of chamber 5. Therefore, in addition to being spaced apart from the primary venturi 4, said conduits 16 extend above the lower end of the latter.

According to the embodiment shown in FIG. 3, each of said secondary adjustment and purification units, comprising a multi-stage venturi, will include an external housing 17, substantially diverging in the direction of the gas flow, and an internal core comprising, in the direction of the gas flow, a first fixed or stationary part 18 and one or more axially movable parts 19' and 19" defining, through annular steps or ridges, along with said housing 17, annular grooves or narrow sections for gas passage, which are positioned subsequent to one another. Where the first groove 20 is a fixed gas passage section adjacent to the stationary part 18, the grooves 21 and 22, in the case of a three-stage venturi, have a gas passage section or cross section that can be gradually varied, as will be better explained below, in order to accomodate the different adjustment conditions.

The movable core parts 19' and 19", within each stage of the venturi, are integral with one another in order to be operated, for example, by a hydraulic cylinder 23 supported by the structure 2, (FIG. 1) and the stem of which is suitably connected through a rod 24 to the movable parts 19' and 19" of the venturi. This rod 24 slides within a tubular element 25 substantially comprising a downward extension of the fixed portion 18 of the core.

The washing water for the multi-stage venturi is supplied through spraying tubes 26 at the upper end of each conduit 16, as shown in FIG. 1. The water, falling down from the lower end of the multi-stage venturi 13 and drawing along additional solid gas particles, collects on the bottom of a conical shaped chamber 14 to exit from a conduit 27. Also in this case and through the intermediary of a suitable overflow (not shown), a water level 28 is established, which level is below said adjustment and purification units 13, so that the purified gas can continuously flow through the drop separator 29 to the overlying outlet conduit 15.

Referring now to FIGS. 3 through 6 of the accompanying drawings, a particular constructive embodiment for one of the multi-stage adjustment and purification units 13 of FIG. 1 will now be described. As shown in FIG. 3; each of the secondary adjustment and purification units 16 substantially comprise a multi-stage venturi including a fixed part or external housing 17, the cross-section of which is increasing or diverging in the direction of the gas flow. In the example shown, said housing 17 comprises cylindrical elements connected to frusto-conical divergent elements, and more particularly comprises a first cylindrical part 30, which is flanged to the gas conduit 16 and connects to a frusto-conical divergent part 31 to form a first stage of the multi-stage venturi. In turn, the frusto-conical portion 31 connects to a cylindrical portion 32 and the housing 17 continues with second and third frusto-conical divergent portions 33 and 34, respectively, the latter of which has a larger diameter aperture than the former. Along with the corresponding internal movable part, said second cylindrical portion 32 and frusto-conical divergent portions 33 and 34 of the housing 17 define the second and third stages, respectively, for the multi-stage gas adjustment and purification venturi. Internally and coaxially with said skirt 17, the above mentioned fixed cylindrical core 18 is securely positioned by the supporting unit 35 to said conduit 16, as shown in FIGS. 3 and 4 of the accompanying drawings. Along with the parts 30 and 31 of the housing 17, this fixed or stationary core 18 defines the first stage of the multi-stage venturi, the annular groove 20 of which has an invariable or constant gas passage section.

Underlying and secured to said fixed or stationary core 18, the tubular element 25 is positioned to support and guide the movable or adjusting parts of the venturi.

As shown in FIG. 3, the movable part of the adjustable stages of the venturi substantially comprises two cylindrical or slightly convergent elements 19' and 19", defining annular steps or ridges 36 and 37, the latter of which has a larger outer diameter than the former. Along with the external housing 17, these annular ridges 36 and 37 form the two grooves or narrow sections 21 and 22 respectively, for the gas passage, as above stated. Suitable seals 36a and 36b are provided at the upper and lower ends respectively of the movable parts, which also center the movable parts. As diagrammatically shown in FIG. 6, these seals are made, for example, of resilient rings 38 of Teflon, positioned on the outer surface of a rubber pad 39, which in turn is clamped by means of a circular plate 40 and a bolt 41 (only one shown in FIG. 6) against the lower surface or underside of annular ridge 36.

The movable part of the venturi, comprising said elements 19' and 19", is supported by means of radial spokes 42 projecting through suitable longitudinal slots or openings in the tubular element 25 and are secured to the rod 24. This rod 24 is longitudinally guided by supports 43 disposed within the tubular element 25 and exits from the scrubber through a lower or bottom seal 24a.

Thus, the tubular element 25 is closed at both ends and is connected to a conduit 44 at its lower end which supplies clean washing water for the seals. After filling the tubular element 25, this water exits from the longitudinal slots provided for the spokes 42 and fills the space between said tubular element and the movable or adjusting venturi part 19', 19", leaking through both the upper seals 36a and the lower seals 36b to collect on the tower bottom.

FIG. 3 shows the divergent form for the external housing 17 of the venturi, substantially comprising a sequence of alternating frusto-conical and cylindrical portions of suitable lengths and angular apertures to provide the desired adjusting characteristics. However, such a housing 17 could obviously be otherwise made and with any other shape, such as a continuous divergent or bell shape, thereby improving the adjusting characteristics or properties of the whole assembly. What should be noted is that the adjustable stages of the venturi can operate either concurrently or subsequently to one another in order to gradually vary the surface of the narrow gas passage grooves or sections by axially moving the movable or adjusting portion of the multi-stage venturi.

Therefore, on the ground of the foregoing and as shown in the accompanying drawings, it can be readily understood that each of the adjustment and purification units comprise a multi-stage venturi having a first stage of a constant cross-sectional area capable of providing at a minimum furnace pressure a sufficient pressure stage or loss of load for obtaining the required degree of purification, and one or more stages of varying cross-sectional area, so devised that as soon as the movable part of the venturi starts to move forward towards the first stage, one or more narrow sections of the subsequent stages will simultaneously or subsequently become contracted and be series connected to the preceding stages. Thus, the adjustment characteristics can be accommodated or varied, depending on the blast furnace operating conditions.

Moreover, since one stage of the venturi is connected to the subsequent stage without any sharp change in cross-section, particularly downstream of the narrow grooves, the goal is reached of minimizing the instability in the gas flow, which should not be over-expanded, thus contributing to the removal of any possible noise sources.

What is claimed is:

1. A scrubber for blast furnace gas, comprising:
   a first gas purifying unit for effecting primary purification of the gas and having means connectable to the furnace for receiving the gas, spray means for discharging a scrubbing fluid into said purifying unit, and a primary venturi coupled to said receiving means and having an annular gas flow passage of substantially constant cross-sectional area;
   a first separation chamber in fluid communication with said primary venturi for receiving the gas from said primary venturi;
   an assembly in fluid communication with said first separating chamber for effecting final gas purification and adjustment of the blast furnace gas pressure, said assembly being disposed in series with said first purifying unit and positioned within a second separation chamber, said assembly comprising a multi-stage venturi receiving gas from said first separation chamber, said multi-stage venturi including a first stage having an annular gas flow passage of substantially constant cross-sectional area and a second stage in series with said first stage and having means defining an annular gas flow passage of variable cross-sectional area;
   second spray means for introducing a scrubbing fluid into said assembly; and
   gas outlet means connected to said second separation chamber.

2. The scrubber according to claim 1, wherein said assembly comprises a plurality of said multi-stage venturis disposed in a parallel functional relationship within said second separation chamber.

3. The scrubber according to claim 2, wherein said plurality of multi-stage venturis are outwardly spaced about said primary venturi, and each of said multi-stage Venturis includes a tubular element extending into said first chamber to an elevational level above the lowermost discharge end of said primary venturi.

4. The scrubber according to claim 1, wherein said multi-stage venturi includes a tubular element extending into said first chamber to an elevational level above the lowermost discharge end of said primary venturi.

5. The scrubber according to claim 1, wherein said multi-stage venturi comprises:
   a fixed elongaged housing with a gas inlet and a gas outlet, the cross-sectional area of said outlet being larger than said inlet; and
   a core structure disposed within said housing and having a stationary portion cooperating with a first portion of said housing to define said constant-area flow passage in said first stage, and an axially-movable portion having an annular projection cooperating with a second portion of said housing to define said variable-area flow passage in said second stage.

6. The scrubber according to claim 5, wherein said housing comprises connected, alternately-disposed cylindrical sections and frusto-conical sections diverging in the direction of the gas flow through said multi-stage venturi, said first housing portion being cylindrical and said second housing portion being frusto-conical, said first and second housing portions being longitudinally separated.

7. The scrubber according to claim 5, wherein said multi-stage venturi includes a third stage disposed between said first and said second stages, said third stage having an annular gas flow passage of adjustable cross-sectional area, said axially movable core portion having a second annular projection cooperating with a third portion of said housing to define said variable-area flow passage in said third stage.

8. The scrubber according to claim 1, wherein said multi-stage venturi includes a third stage disposed between said first and said second stages, said third stage having means defining an annular gas flow passage of adjustable cross-sectional area.

9. The scrubber according to claim 1, wherein said multi-stage venturi comprises:
- a stationary housing having an elongated, flared configuration with at least one section of substantially constant diameter, and a gas inlet and a gas outlet, with the gas outlet being of a larger diameter than the gas inlet;
- a core member disposed within said housing and having a stationary cylindrical portion cooperating with said constant-diameter section of said housing to define said flow passage of constant cross-sectional area between said stationary portion and said housing section, said core member also having a second portion axially movable within said housing and cooperating with said housing to define said second flow passage between said movable portion and said housing of a variable cross-sectional area;
- a tubular element within said core member for guiding the movement of said movable portion, and having a plurality of longitudinal slots;
- a rod movably disposed within said tubular element;
- support means extending through said longitudinal slots of said tubular element for supporting said core movable portion on said rod; and
- drive means disposed externally of the scrubber and coupled to said rod for effecting axial movement of said core movable portion to change the area of said second flow passage.

10. The scrubber according to claim 9, further including a supply tube for introducing scrubbing fluid to said multi-stage venturi, and said tubular element is closed at both ends, with said supply tube being connected to one end of said tubular element.

11. The scrubber according to claim 9, further including sealing means disposed at the ends of said core movable portion.

12. The scrubber according to claim 9, wherein said core movable portion includes a frustro-conical element converging toward the gas outlet of said housing.

* * * * *